US007936686B2

(12) United States Patent
Felten

(10) Patent No.: US 7,936,686 B2
(45) Date of Patent: May 3, 2011

(54) COMMUNICATION STATE PUBLISHING GATEWAY

(75) Inventor: Frédéric Felten, Tonquedec (FR)

(73) Assignee: France Telecom, Paris (FR)

( * ) Notice: Subject to any disclaimer, the term of this patent is extended or adjusted under 35 U.S.C. 154(b) by 731 days.

(21) Appl. No.: 10/599,294

(22) PCT Filed: Mar. 25, 2004

(86) PCT No.: PCT/FR2005/050186
§ 371 (c)(1),
(2), (4) Date: Sep. 25, 2006

(87) PCT Pub. No.: WO2005/094021
PCT Pub. Date: Oct. 6, 2005

(65) Prior Publication Data
US 2007/0192479 A1     Aug. 16, 2007

(30) Foreign Application Priority Data

Mar. 25, 2004  (FR) ...................................... 04 03059

(51) Int. Cl.
*H04J 3/14* (2006.01)
*G06F 15/173* (2006.01)
(52) U.S. Cl. ........................................ 370/252; 709/223
(58) Field of Classification Search ........................ None
See application file for complete search history.

(56) References Cited

U.S. PATENT DOCUMENTS
2003/0018726 A1 *  1/2003  Low et al. ..................... 709/206

FOREIGN PATENT DOCUMENTS
WO      01/56308       8/2001
WO      03/003694      1/2003

OTHER PUBLICATIONS

Campbell B et al: "Request for Comments 3428: Session Initiation Protocol (SIP) Extension for Instant Messaging", Network Working Group, Dec. 1, 2002, XP015009171 *part 1*.
Crocker D et al: "Common Presence and Instant Messaging (CPIM) (draft-ietf-impp-cpim-03.txt)", Network Working Group, Aug. 14, 2002, XP015002047 *part 1* *part 3.3*.

* cited by examiner

*Primary Examiner* — Kevin C Harper
(74) *Attorney, Agent, or Firm* — Lowe Hauptman Ham & Berner LLP

(57) ABSTRACT

Once a gateway connected to access networks and a packet network has received a notification of a communication state relating a terminal, a gateway that publishes communication states of terminals transforms a current communication state of the terminal into an instant messaging communication state. The instant messaging communication state is then transferred to an instant messaging server so terminals can consult communication states of the terminal.

11 Claims, 2 Drawing Sheets

US 7,936,686 B2

COMMUNICATION STATE PUBLISHING GATEWAY

REFERENCE TO RELATED APPLICATION

This application is a 371 of the PCT International Application No. PCT/FR2005/050186 filed Mar. 22, 2005, which is based on the French Application No. 0403059 filed Mar. 25, 2004.

BACKGROUND OF THE INVENTION

1. Field of the Invention

The present invention relates to a method of publishing terminal communication states between a publishing gateway and an instant messaging server.

2. Description of the Prior Art

Emerging protocols such as the Session Initiation Protocol for Instant Messaging and Presence Leveraging Extension (SIMPLE) and Wireless Village Instant Messaging and Presence Service (Wireless Village IMPS) enable terminals to determine between them the communication state of one of them. Two major drawbacks of the protocols are the necessity to adapt the terminal to the protocol used and to use the same protocol in terminals that have to communicate with each other.

An instant messaging protocol used on the Internet enables a connected computer to determine the communication state of another computer and enables a user voluntarily to publish the communication state of his computer. However, this latter protocol is confined to the Internet.

OBJECT OF THE INVENTION

An object of the present invention is to make available to a terminal the communication state of another terminal independently of the technology and the access networks of the terminals and without having to set up an end-to-end call between the terminals.

SUMMARY OF THE INVENTION

Accordingly, a method of publishing the communication state of a terminal connected to an access network detecting a communication state of the terminal notified as a current communication state to communication state publishing means connected to the access network and to a packet network is characterized in that it comprises:

transforming the current communication state of the terminal into an instant messaging communication state in the publishing means, and transferring the instant messaging communication state from the publishing means to an instant messaging server connected to the packet network.

The method may comprise, prior to transformation, selecting a voluntary communication state and selecting an apparent communication state corresponding to the voluntary communication state in a database as a function of an identifier of the terminal transmitted by the publishing means, and if the apparent communication state is different from the current communication state, modifying the current communication state to the apparent communication state in the publishing means.

Thus the user of the terminal can advantageously select a communication state of his terminal that is defined independently of its detected state, and more generally independently of terminal states recognized by the access network of the terminal, to make it correspond to an apparent communication state imposed by the user in relation to third parties seeking to communicate with the user's terminal.

The voluntary communication state may be selected by the terminal on a server connected to the packet network and then stores in the database.

The method may further comprise selecting a current action to be established in the access network of the terminal and associated with the current communication state in a database as a function of an identifier of the terminal transmitted by the publishing means in order for that action to be commanded subsequently by the publishing means, and also selecting an action associated with the voluntary communication state, and modifying the current action to the action associated with the voluntary communication state.

The action associated with the voluntary communication state may be selected by the terminal on a server connected to the packet network and then stores in the database.

The invention further relates to a system for publishing the communication state of a terminal connected to an access network detecting a communication state of the terminal notified as the current communication state, the system comprising communication state publishing means connected to the access network and to a packet network and being characterized in that the publishing means comprises:

means for transforming the current communication state of the terminal into an instant messaging communication state, and means for transferring the instant messaging communication state from the publishing means to an instant messaging server connected to the packet network.

BRIEF DESCRIPTION OF THE DRAWINGS

Other features and advantages of the present invention will become more clearly apparent on reading the following description of preferred embodiments of the invention given by way of nonlimiting example with reference to the corresponding appended drawings, in which.

DESCRIPTION OF EMBODIMENTS

Figure 1:
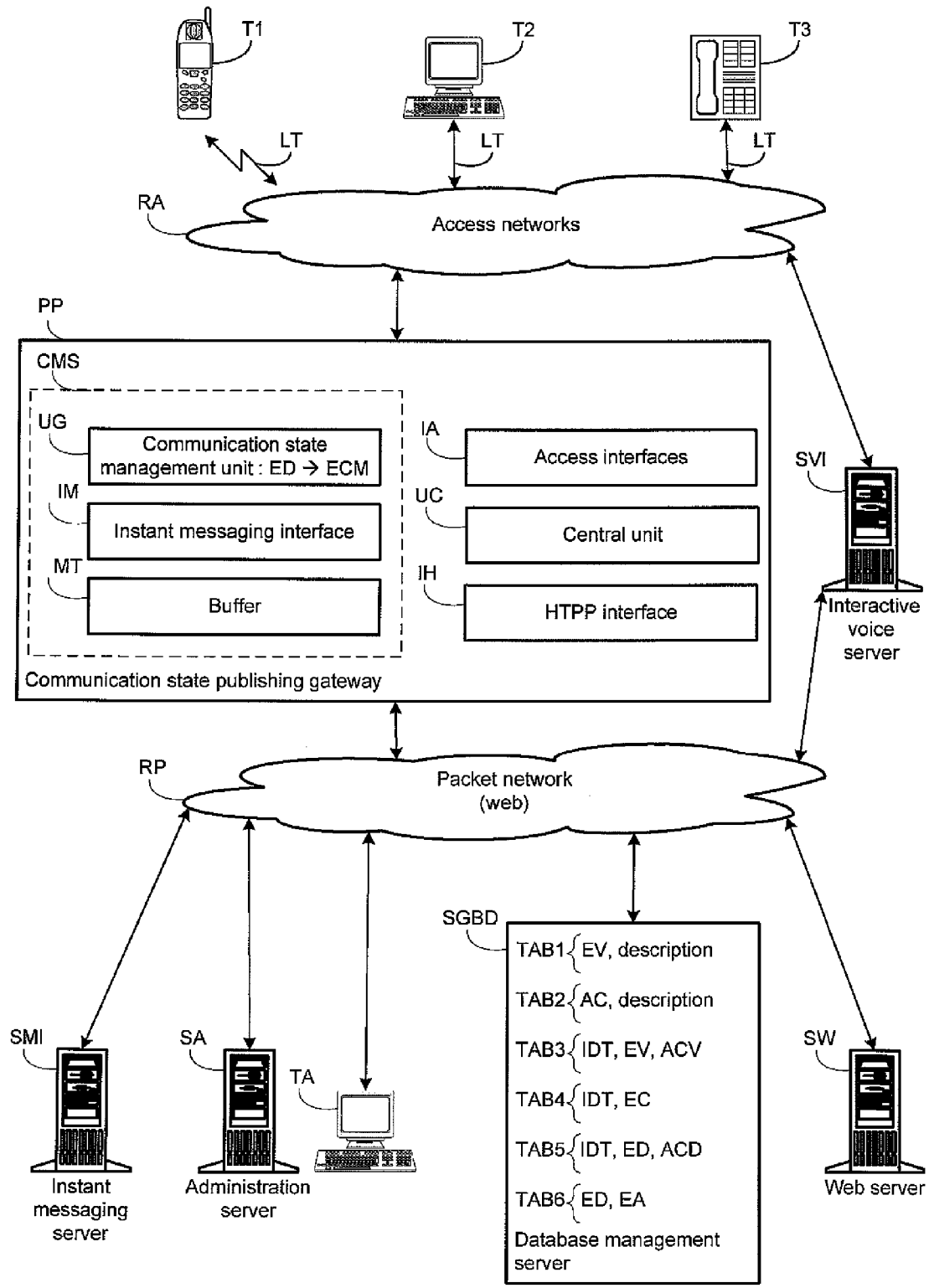
FIG. 1 is a schematic block diagram of a communication state publishing system using a communication state publishing gateway of the invention.

Referring to FIG. 1, the publishing system of the invention primarily comprises a communication state publishing gateway PP, an instant messaging server SMI, a web server SW, a database management server SGBD, an administration server SA, an administrator terminal TA, an interactive voice server SVI and at least one user terminal T. FIG. 1 shows three user terminals T1, T2 and T3 that are interchangeably designated T in the remainder of the description.

The publishing gateway PP communicates with the servers SMI, SW, SGBD, SA and SVI via an Internet Protocol type high bit rate packet network RP and with user terminals T via access networks RA. The voice server SVI communicates with the user terminals T via the access networks RA.

In the context of an intelligent communication network, the publishing gateway PP is a service control point or is connected to a service control point.

In the embodiment illustrated in FIG. 1, the terminal T is connected to a respective access network RA by a connection LT.

For example, the terminal T is a cellular mobile radio communication terminal T1, the connection LT is a radio communication channel, and the respective access network RA comprises the fixed network of a radio communication network, for example of the GSM (Global System for Mobile communications) type offering a General Packet Radio Service GPRS or of the UMTS (Universal Mobile Telecommunications System) type.

In another example, the terminal T is a personal computer T2 connected directly by modem to a connection LT of the xDSL or ISDN (Integrated Services Digital Network) type connected to the corresponding access network RA.

In a further example, the terminal T is a fixed telecommunication terminal T2, the connection LT is a telephone line and the respective access network RA is the switched telephone network.

In further examples, the user terminal T comprises an electronic telecommunication device or object personal to the user, which may be a communicating personal digital assistant (PDA). The terminal T may be any other portable or non-portable domestic terminal such as a video games console or an intelligent television receiver cooperating with a remote controller incorporating a display or with an alphanumeric keyboard incorporating a built-in mouse connected by an infrared link.

The user terminals T and the access networks RA are not limited to the above examples and may consist of other known terminals and access networks.

The invention defines three communication states: a detected communication state ED, a voluntary communication state EV, and an apparent communication state EA. A detected communication state ED is a state of a terminal detected by means internal to the respective access network RA and transmitted to the publishing gateway PP, such as "off-hook" (seizure of connection), "waiting for dial tone", "free", "Tbusy", "unavailable", "on-hook" (clearing down). The detected communication states ED are linked to the access networks of the terminals and their number is therefore finite.

A voluntary communication state EV reflects the state of a terminal decided on by the user of the terminal vis á vis other means, such as "do not disturb", "temporarily absent" or "away". The voluntary communication states are not limited in number, and new voluntary communication states can easily be created.

An apparent communication state EA corresponds to a standard communication state of a terminal in the access network RA. The apparent communication states are defined as respective detected communication states.

There are equivalences between the apparent communication states EA and the voluntary communication states EV. One or more voluntary communication states EV correspond(s) to an apparent communication state EA. For example, the voluntary communication states EV "do not disturb" and "away" may correspond to the apparent communication state "busy". In a further example, a third party user who calls a terminal T whose user has decided he does not wish to be disturbed for a predetermined time period is made aware of the "unavailable" apparent communication state, which corresponds to the "do not disturb during predetermined time period" voluntary communication state decided on by the user of the terminal T, although the terminal T may be used for outgoing calls during the predetermined time period.

The database management server SGBD primarily includes a database storing data relating to the administration of the gateway PP, such as configuration parameters and tables TAB1 to TAB6 described below.

The table TAB1 includes a list of voluntary communication states EV associated with respective voluntary communication state descriptions.

The table TAB2 includes a list of actions AC associated with respective action descriptions. An action is a service established in the access network RA of the terminal T that a user wishes to match to a communication state of his terminal. For example, if the communication state of a first user terminal is "busy", a call from a second terminal to the first terminal is transferred to the answering service of the first terminal; consequently, the action is "transfer to answering service". In the above example, the action could equally have been "send warning beep" to the first terminal.

The table TAB3 matches identifiers IDT of a user terminal that subscribes to a communication state selection service and any voluntary communication states EV that may be associated with a voluntary state action ACV.

The table TAB4 matches terminal identifiers IDT and current communication states EC of the terminals respectively.

The table TAB5 matches each terminal identifier IDT and a detected communication state ED associated with a detected state action ACD.

The table TAB6 matches a communication state EV decided on voluntarily by the user of the terminal T and an apparent communication state EA.

The publishing gateway PP primarily comprises access interfaces IA, a call state management unit UG, an instant messaging interface IM, a buffer MT, a central unit UC and an HTTP interface IH. The communication state management unit UG, the instant messaging interface IM and the buffer MT form an instant messaging client CMS relative to the servers via the network RP.

The access interfaces IA handle communications between the publishing gateway PP and the access networks RA. The access interfaces IA are adapted respectively to the access network types and the protocols that they use, for example the INAP (Intelligent Network Application Part) protocol for the switched telephone network and the CAP (Customized Applications for Mobile Network Enhanced Logic Application Part) protocol for the cellular radio telephone network. The detected communication states of the terminals pass through the access interfaces IA.

The buffer MT stores user terminal contexts temporarily during operation of the publishing gateway PP. A context includes at least one calling terminal identifier IDT associated with a current communication state EC and where applicable a called terminal identifier IDT. A context may also include information on the context date, the date at which a change of the detected communication state ED of a terminal was notified to another terminal.

The communication state management unit UG transforms detected communication states ED into instant messaging communication states ECM. The instant messaging communication states ECM depend on an instant message protocol used between the publishing gateway PP and the instant messaging server SMI.

The instant messaging interface IM transfers instant messaging communication states ECM to the instant messaging server SMI using an instant messaging protocol such as JABBER, MSN Messenger or ICQ. Consequently, the instant messaging interface IM is specific to the instant messaging protocol used or integrates modules specific to each protocol in order for the messaging interface IM to adapt to the protocol used by the messaging server SMI.

The central unit UC interrogates the database management server SGBD via the HTTP interface IH in order, among other things, to match a detected communication state ED of a terminal and a detected state action ACD.

The HTTP interface IH handles communication between the publishing gateway PP and the administration server SA and database management server SGBD connected to the packet network RP using the HTTP (HyperText Transfer Protocol) transport protocol.

The administration server SA makes available to the administrator terminal TA a software interface that the user of the administrator terminal TA uses to monitor and administer the publishing gateway PP. The administration server SA communicates with the publishing gateway PP and the database management server SGBD to access the configuration data of the publishing gateway PP.

The administrator terminal TA is typically a personal computer connected to the packet network RP over which it communicates with the administration server SA. The administrator terminal TA has access to the software interface after the terminal TA is connected to the administration server SA.

The instant messaging server SMI is a standard instant messaging server commonly used in instant messaging services between computers. The protocol used between the publishing gateway PP and the instant messaging server SMI depends on the messaging server SMI type. The messaging server SMI makes the instant messaging communication states ECM of one or more terminals connected to the networks RA and/or to the network RP available to a terminal T of a third party user subscribing to a terminal communication status consultation service as proposed by the invention. The terminal of the third party user is often a personal computer.

The web server SW and the interactive voice server SVI communicate with the database management server SGBD via the packet network RP.

The web server SW makes a software interface for voluntary communication state selection of one or more of its terminals available to a user terminal connected to the packet network RP and subscribing to a terminal communication state selection service as proposed by the invention. The user terminal selects the voluntary communication state EV that it requires for its terminal from a list of voluntary communication states obtained from the table TAB1. The correspondence between the voluntary communication state EV selected and the terminal identifier IDT is stored in the table TAB3.

In a variant of this, the user terminal T selects an applicable voluntary communication state in accordance with time and date data, such as a start time or date or a time interval between two specific times or dates.

Moreover, the user terminal selects the action AC that it wishes to have associated with one or more voluntary communication states EV in a list of actions obtained from the table TAB2. The match between the action AC and the voluntary communication state EV is stored in the table TAB3. The action AC is then a voluntary state action ACV.

The same web server SW or another web server connected to the packet network RP makes a software interface for consulting one or more instant messaging communication states ECM of preselected terminals available to the same user terminal or to a terminal of another user who subscribes to the terminal communication state consultation service. The web server SW recovers the information on the instant messaging communication states ECM of the preselected terminals from the messaging server SMI.

In a variant of this, a web server stores the contexts associated with a terminal in a database in order for the user of the terminal to be able to consult a historical record of his calls.

The interactive voice server SVI offers the same functions as the web server(s) SW via a terminal communication state selection voice service and/or a terminal communication state consultation voice service.

Figure 2:
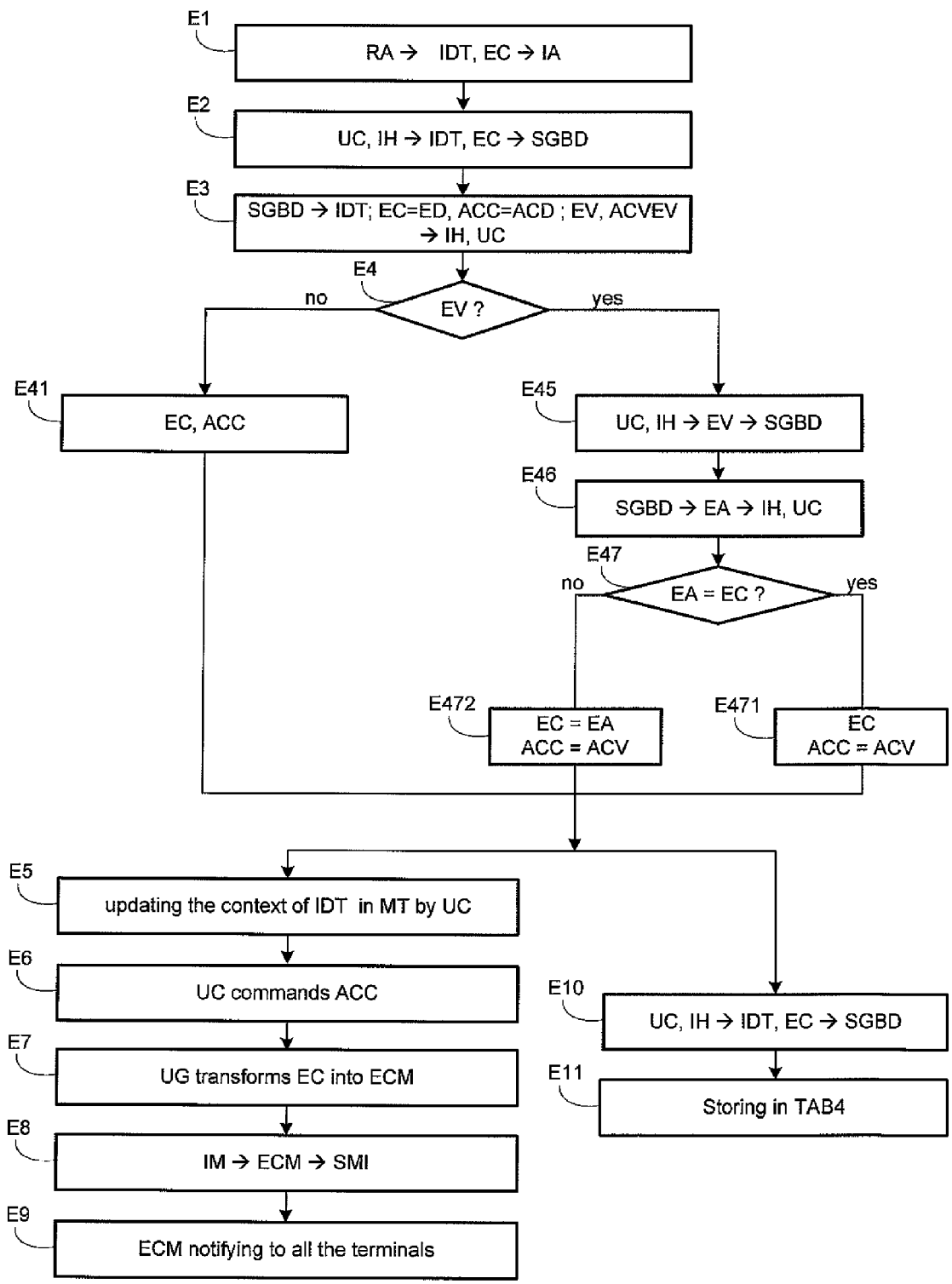
FIG. 2 shows a flowchart of a communication state publishing method of the invention.

As shown in FIG. 2, the method in accordance with the invention of publishing communication states relating to any user terminal T essentially comprises steps E1 to E11.

All the steps are executed for each change of communication state of the terminal T.

In the step E1, the access network RA to which the terminal T is connected notifies the publishing gateway PP of a change in the detected communication state ED of a terminal T, giving the identifier IDT of the terminal T and the new detected communication state of the terminal as the current communication state EC. The access interface IA, the function of which is to interface the access network RA with the gateway PP, receives the current communication state EC of the terminal T.

As will emerge hereinafter, during communication between a third party terminal and the terminal T, the current communication state EC is read in the context associated with the terminal T in the buffer MT of the gateway PP, either as the detected communication state if no voluntary communication state is associated with the terminal T, or as the apparent communication state if a voluntary communication state has been selected by the user of the terminal T.

For example, if the terminal T is in an intelligent network based on the switched telephone network, a service access switch managing the detected communication states ED of the terminals transfers the change of detected communication state ED of the terminal T to a service control point attached to a routing autonomy switch of the switched telephone network. According to the invention that service control point is the publishing gateway PP or is connected to the publishing gateway PP.

For example, when setting up communication between two terminals, the access networks RA notify the new detected communication states of the two terminals.

The central unit CC sends an enquiry including the terminal identifier IDT and the current communication state EC to the management server SGBD via the HTTP interface IH in the step E2. This enquiry asks the management server SGBD if there are any voluntary communication states EV associated with the terminal T.

The management server SGBD selects in the table TAB3 the voluntary communication state EV and the voluntary state action ACV as a function of the terminal identifier IDT. It selects in the table TAB5 the current action ACC associated with the current communication state EC, respectively corresponding to the detected state action ACD and the detected call state ED. The management server SGBD transfers with the identifier IDT of the terminal T the foregoing parameters EC, ACC and where applicable EV, ACV in a response to the publishing gateway PP, and to the HTTP interface IH therein, in the step E3.

In the step E41, if the response from the management server SGBD informs the central unit UC that there is no voluntary communication state EV associated with the identifier IDT of the terminal T in the step E4, the current communication state EC of the terminal is not modified and is identical to the new detected communication state transmitted in the step E1. The current action ACC is not modified and corresponds to the action associated with the new detected communication state.

If the central unit UC is informed that there is a voluntary communication state EV associated with the identifier IDT of the terminal T in the step E4, the central unit UC interrogates the management server SGBD in the step E45, transferring the voluntary communication state EV previously selected to it, in order for the management server SGBD to transmit the apparent communication state EA corresponding to the voluntary communication state EV in the table TAB6 to the central unit UC in the step E46. The voluntary state action ACV is imposed with respect to the current action ACC. Consequently, the current action ACC is modified into the voluntary state action ACV.

The central unit UC then compares the transmitted detected communication state EDV to the current communication state EC in the step E47. If the two communication states EDV and EC are identical, the current communication state EC is not modified in the step E471. If the two communication states EA and EC are not identical, the central unit UC modifies the current communication state EC to make it identical to the transmitted apparent communication state EA in the step E472.

After the step E41, E471 or E472, in the step E5 the central unit UC checks for updating in the buffer MT of the context corresponding to the identifier IDT of the terminal T, more particularly updating of the current communication state EC and the current date of the context, for example. The central unit UC then commands the current action ACC to be effected in the step E6 via the access interface IA.

In the step E7, the communication state management unit UG transforms the current communication state EC into a current instant messaging communication state ECM conforming to the instant messaging protocol used, the current communication state being either a detected communication state ED or an apparent communication state EA.

The instant messaging interface IM transfers the current instant messaging communication state ECM of the terminal T to the instant messaging server SMI over the packet network RP in the step E8.

In the step E9, the instant messaging server SMI makes the new instant messaging communication state ECM of the terminal T available to all the terminals subscribing to the consultation service or notifies that state to them.

In parallel with the steps E5 to E9, the central unit UC transmits at least the identifier IDT of the terminal T and the current communication state EC to the database management server SGBD over the HTTP interface IH in the step E10.

In the step E11, the server SGBD stores the current communication state EC in the table TAB4 of its database in corresponding relationship to the terminal identifier IDT.

If the publishing gateway PP is stopped, it is reinitialized automatically on again receiving data from the access networks RA.

In a variant of this, some or all of the data from the database of the database management server SGBD is stored directly in a database of the publishing gateway PP.

In another variant, one or plural servers SA, SGBD and SW are installed in the publishing gateway PP.

The invention claimed is:

1. A method of publishing a communication state of a terminal connected to an access network that detects a communication state of said terminal, including:
    notifying said communication state of said terminal as a current communication state from said access network to a communication state publishing gateway connected to said access network,
    enquiring a database from said publishing gateway via a packet network to select a voluntary communication state previously decided by said terminal in said database as a function of an identifier of said terminal transmitted by said publishing gateway to said database and, if a voluntary communication state is associated with the identifier of the terminal, enquiring the database from said publishing gateway via said packet network to select an apparent communication state corresponding to said voluntary communication state in said database, and
    responsive to said apparent communication state differing from said current communication state:
    modifying said current communication state to said apparent communication state in said publishing gateway,
    transforming said apparent communication state of said terminal into an instant messaging communication state in said publishing gateway, and
    transferring said instant messaging communication state from said publishing gateway to an instant messaging server connected to said packet network.

2. A method as claimed in claim 1, wherein said voluntary communication state is selected by said terminal on a server connected to said packet network and then stored in said database.

3. A method as claimed in claim 1, including selecting a current action to be established in said access network of said terminal and associated with said current communication state in a database as a function of said identifier of said terminal transmitted by said publishing gateway in order for said current action to be commanded subsequently by said publishing gateway.

4. A method as claimed in claim 1, including selecting a current action to be established in said access network of said terminal and associated with said current communication state in a database as a function of an identifier of said terminal transmitted by said publishing gateway in order for said current action to be commanded subsequently by said publishing gateway, selecting an action associated with said voluntary communication state, and modifying said current action to said action associated with said voluntary communication state.

5. A method as claimed in claim 4, wherein said action associated with said voluntary communication state is selected by said terminal on a server connected to said packet network and then stores in said database.

6. A publishing gateway for publishing a communication state of a terminal connected to an access network that is adapted to detect a communication state of said terminal, said publishing gateway comprising:
    an access interface connected to said access network for receiving a notification of said communication state of said terminal as a current communication state from said access network,
    an enquiring unit for enquiring a database via a packet network to select a voluntary communication state previously decided by said terminal in said database as a function of an identifier of said terminal transmitted by said publishing gateway to said database and, if a voluntary communication state is associated with the identifier of the terminal, for enquiring the database from said publishing gateway via said packet network to select an apparent communication state corresponding to said voluntary communication state in said database,
    a communication state modifying unit arranged to modify said current communication state to said apparent communication state in said publishing gateway responsive to said apparent communication state differing from said current communication state,
    a communication state management unit arranged to transform said apparent communication state of said terminal into an instant messaging communication state, and
    an instant messaging interface arranged to transfer said instant messaging communication state to an instant messaging server connected to said packet network.

7. A method as claimed in claim 1, wherein said voluntary communication state is selected by a user of said terminal.

8. A method as claimed in claim 7, wherein said voluntary communication state is defined independently of said detected communication state of said terminal.

9. A publishing gateway as claimed in claim 6, the communication state management unit arranged to transform said apparent communication state of said terminal into an instant messaging communication state responsive to said apparent communication state differing from said current communication state.

10. A publishing gateway as claimed in claim 6, the instant messaging interface arranged to transfer said instant messaging communication state to an instant messaging server connected to said packet network responsive to said apparent communication state differing from said current communication state.

11. An advising gateway for advising a communication state of a terminal connected to an access network that is adapted to detect a communication state of said terminal, said advising gateway comprising:
   an access interface connected to said access network for receiving a notification of said communication state of said terminal as a current communication state from said access network,
   an enquiring unit for enquiring a database via a packet network to select a voluntary communication state previously decided by said terminal in said database as a function of an identifier of said terminal transmitted by said publishing gateway to said database and, if a voluntary communication state is associated with the identifier of the terminal, for enquiring the database from said publishing gateway via said packet network to select an apparent communication state corresponding to said voluntary communication state in said database,
   a communication state modifying unit arranged to modify, responsive to said apparent communication state differing from said current communication state, said current communication state to said apparently communication state in said advising gateway,
   a communication state management unit arranged to transform, responsive to said apparent communication state differing from said current communication state, said apparent communication state of said terminal into an instant messaging communication state, and
   an instant messaging interface arranged to transfer, responsive to said apparent communication state differing from said current communication state, said instant messaging communication state to an instant messaging server connected to said packet network.

* * * * *